April 26, 1938.  O. B. GOLDKAMP  2,115,259

COMBINATION PRESSURE REGULATOR AND METER

Filed Oct. 28, 1935  2 Sheets-Sheet 1

Inventor
Otto B. Goldkamp
A. B. Bowman
Attorney

April 26, 1938.   O. B. GOLDKAMP   2,115,259
COMBINATION PRESSURE REGULATOR AND METER
Filed Oct. 28, 1935   2 Sheets-Sheet 2
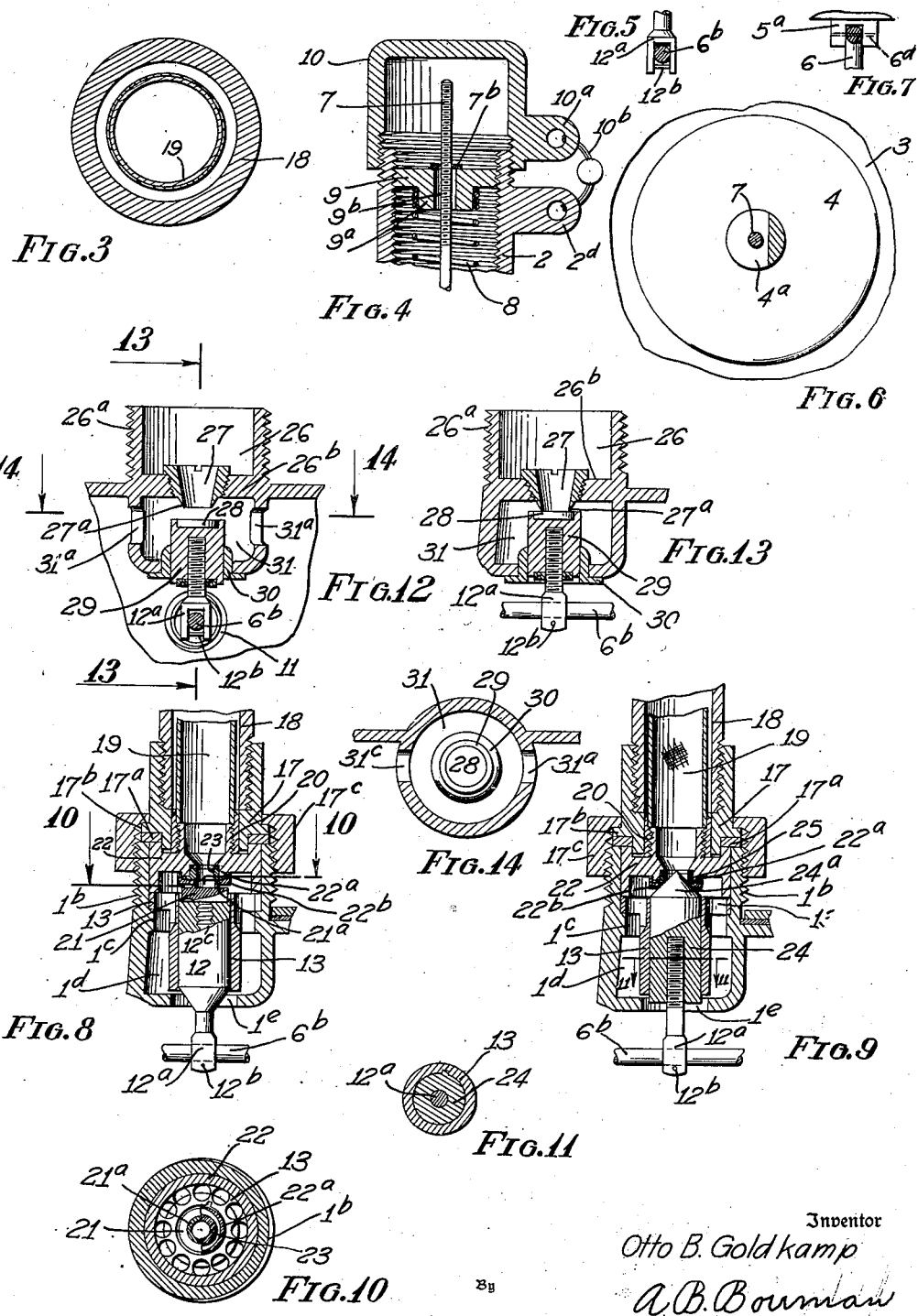
Inventor
Otto B. Goldkamp
A. B. Bowman
Attorney Patented Apr. 26, 1938

2,115,259

UNITED STATES PATENT OFFICE 2,115,259

COMBINATION PRESSURE REGULATOR AND METER

Otto B. Goldkamp, San Diego, Calif., assignor of one-half to San Diego Consolidated Gas and Electric Company, San Diego, Calif., a corporation of California Application October 28, 1935, Serial No. 47,068

4 Claims. (Cl. 73—199)

My invention relates to a combination pressure regulator and meter, particularly adapted for commercial gas, and the objects of my invention are:

First, to provide an apparatus of this class which combines with the cap of a conventional Sprague gas meter for domestic or other use a pressure regulator.

Second, to provide an apparatus of this class in which the meter and regulator are so arranged and combined that there is provided a very compact structure of this class.

Third, to provide a compact assembly of the necessary units for regulating and measuring the gas for domestic and similar use.

Fourth, to provide a structure of this class which reduces to a minimum the chance for leakage in connection with the regulation and measuring of fluid gas for domestic or similar use.

Fifth, to provide a structure of this class in which it is easy to repair and keep in repair the units for measuring and regulating gas.

Sixth, to provide a combination of this class which is very simple and economical of construction, easy to operate, efficient in its action, and which will not readily deteriorate or get out of order.

Figure 1:
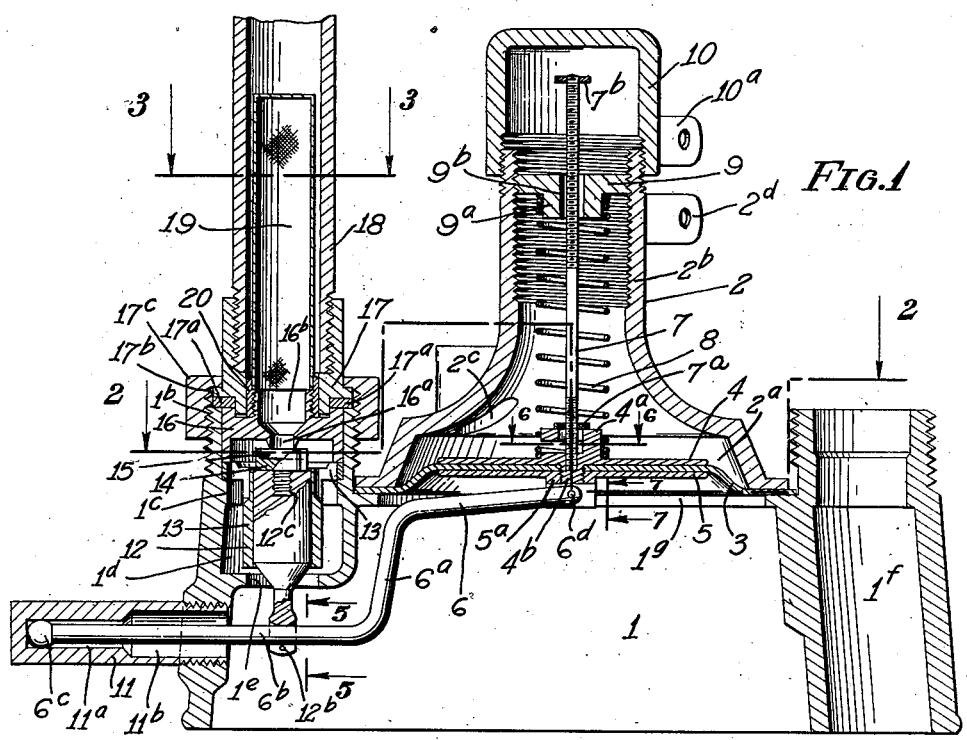
Figure 2:
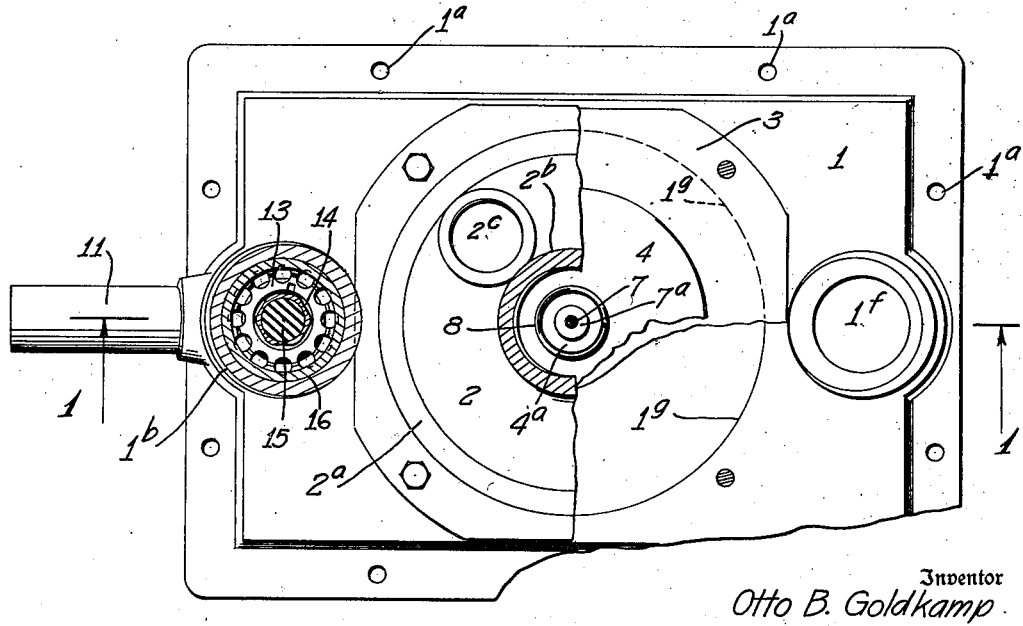

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a sectional view along the line 1—1 of Fig. 2 of the complete apparatus showing some of the parts in elevation to facilitate the illustration; Fig. 2 is a sectional view along the line 2—2 of Fig. 1 and showing other parts further broken away and in section, and showing some of the parts in elevation to facilitate the illustration; Fig. 3 is a sectional view through line 3—3 of Fig. 1 on an enlarged scale; Fig. 4 is a detail of the upper portion of the regulator casing shown in section showing the seal for sealing the cap on the regulator casing; Fig. 5 is a sectional view along the line 5—5 of Fig. 1; Fig. 6 is a sectional view along the line 6—6 of Fig. 1; Fig. 7 is a sectional view along the line 7—7 of Fig. 1; Fig. 8 is a sectional view of a modified form of regulator valve to that shown in Fig. 1 of the drawings showing some of the parts in elevation to facilitate the illustration; Fig. 9 is another similar view of another modified form of regulator valve; Fig. 10 is a sectional view along the line 10—10 of Fig. 8; Fig. 11 is a sectional view along the line 11—11 of Fig. 9, Fig. 12 is another similar view of another modified form of regulator valve, Fig. 13 is a sectional view on the line 13—13 of Fig. 12, and Fig. 14 a sectional view on the line 14—14 of Fig. 12.

Similar characters of reference refer to similar parts and portions throughout the several views of the drawings.

The meter cap member 1, regulator casing member 2, regulator diaphragm 3, regulator diaphragm top plate 4, regulator diaphragm bottom plate 5, regulator lever 6, regulator locking stem 7, regulator spring 8, regulator spring adjusting nut 9, regulator casing member cap 10, regulator lever guide 11, valve plunger 12, valve plunger guide 13, valve support 14, valve member 15, valve seat member 16, inlet conductor support 17, inlet conductor 18, dust trap 19, and dust trap support 20 constitute the principal parts and portions of my combination pressure regulator, fluid cleaner and meter.

The meter is of the conventional Sprague type and the cap 1 is a conventional Sprague meter cap and is secured thereon by means of screws in the holes 1a or other means of forming a tight joint between the meter and cap 1. This cap 1 is provided at one side with a fluid inlet portion consisting of an upwardly extended threaded portion 1b. This inlet member is provided with an inwardly extending shoulder portion 1c below which is formed a chamber 1d, the lower wall of which is provided with orifice 1e. Positioned on the opposite side of the meter cap 1 from the inlet portion 1b is an outlet portion 1f, and centrally in the upper side of the casing between the inlet and the outlet portions is a large opening 1g. Over this opening 1g and extending past the sides thereof is a regulator diaphragm 3, which is supported at its periphery by means of the regulator casing member 2 shown best in Figure 1 of the drawings. This diaphragm 3 is supported centrally at its upper side by means of diaphragm top plate 4, which is provided on its upper side with an upwardly extending lug portion 4a around which the lower end of the spring 8 is positioned. This plate 4 also supports the regulator locking stem 7 at its lower end as shown best in Figure 1 of the drawings, the lower end of the stem 7 being screw-threaded into the plate 4 and there is provided a lock nut 7a which sets against the upper side of the lug 4a. This plate 4 is also provided with a downwardly extending externally threaded lug portion 4b upon which the regulator diaphragm bottom plate 5 is screw-threaded so that it rests against the lower side of the diaphragm 3. This bottom plate 5 is also provided with a downwardly extending lug portion 5a which is slotted as shown best in Figures 1 and 7 of the drawings, in which slot is pivotally mounted the one end of the regulator lever 6 supported by means of a pin 6d therein. This lever 6 is shown best in Figure 1 of the drawings provided with a downwardly extending portion 6a and a substantially horizontal portion 6b and the extended end is provided with an enlarged spherical portion 6c which is positioned in a lever guide 11 which is a hollow cylindrical member provided with external threads at one end which are screw-threaded into the one side of the cap member 1 and extends outwardly therefrom, as shown best in Figure 1 of the drawings.

The guide 11 is provided with a small bore 11a which provides a clearance fit for the spherical portion 6c of the lever 6, and is also provided with an enlarged bore 11b to provide clearance for slight shifting of the lever at its guided end.

The regulator casing member 2 is provided with a diaphragm portion 2a at its lower end and with a reduced cylindrical portion 2b which extends upwardly therefrom and is also provided in one side with an air vent 2c to equalize the air pressure as it is open to atmospheric pressure. Casing member 2 is screw-threaded both internally and externally at its upper end, and it is adapted to receive a cap 10 which is screwed thereon. This cap member 10 is provided with an extending perforated lug 10a and the casing 2 also provided with an extending perforated lug 2d which are adapted to receive a seal 10b as shown best in Figure 4 of the drawings, thus providing means for sealing the cap member in position on the casing 2 so that it can be determined whether or not said cap has been removed by unauthorized persons. Screw-threaded in the internal threads of the casing 2 is the regulator spring adjusting nut 9 which is provided with a downwardly extending lug 9a around which the upper end of the regulator spring 8 is positioned. This adjusting nut 9 is also provided with a central orifice 9b through which the upper end of the stem 7 extends, as shown best in Figure 1 of the drawings. The upper end of this stem 7 is screw-threaded and mounted thereon is a nut 7b which is adapted to be set down against the nut 9 as shown in Figure 4 of the drawings for locking the apparatus so that the fluid cannot pass through the meter, and when the cap is positioned thereon and sealed as shown in Figure 4 of the drawings, the meter is inoperative, and would show any unauthorized tampering of the same if the seal is broken.

Mounted in the chamber 1d and supported on shoulders 1c is the valve plunger guide 13 in which is reciprocably mounted the valve plunger 12. This valve plunger 12 extends downwardly through the orifice 1e in the cap 1 and is provided with a downwardly extending lug 12a on its lower end which is bifurcated and adapted to receive the horizontal portion 6b of the lever 6 all as shown best in Figures 1 and 5 of the drawings, and held thereon by means of a pin 12b. The portion 12a is provided with a curved surface which provides a pivot engagement with the lever 6 as shown best in Figure 1 of the drawings. Thus it will be noted that the plunger 12 is slightly reciprocated with the operation of the diaphragm 3 which operates the lever 6 supported in the guide 11. The valve plunger 12 is provided with a threaded hole 12c in its upper end in which is supported the valve support 14, which is provided with a recess in its upper side in which is mounted the valve member 15 upon which is seated the annular seat 16a of the valve seat member 16. This valve seat member 16 is secured in the upper portion of the inlet member 1b of the cap 1 and supported on the upper end of the guide 13 therein so that the upper edge of the member 16 is flush with the upper edge of the member 1b as shown best in Figure 1 of the drawings. Mounted on the upper ends of the members 1b and 16 is a gasket member 17a, and on this gasket member 17a is mounted the inlet conductor support 17, which is provided with an outwardly extending flange 17b, over which a nut 17c is screw-threaded on the upper end of the member 1b thus supporting the member 17 relative to the member 16 and forming a tight join therebetween by means of the gasket 17a, and also a tight join between said members and the nut 17c. Mounted in the member 17 is the fluid inlet conductor 18 which is screw-threaded therein as shown best in Figure 1 of the drawings.

Mounted on the inside of the member 17 is a dust trap support 20 which is screw-threaded onto an externally extended upwardly extending flange portion of the member 16, and mounted in this support 20 and extending upwardly therefrom is a dust trap 19 in cylindrical form with closed end, formed of gauze or other suitable material for trapping the dust from the fluid and preventing it entering the valve and meter. The member 16 is provided with an orifice 16b through which the fluid passes from the dust trap 19 past the valve seat 16a, valve 15, and orifice 1e into the meter cap 1, where the pressure is regulated by means of the diaphragm 3 through the lever 6 which controls the valve which regulates the inlet flow of the fluid.

In the modified form of valve construction as shown in Figures 8 and 10 of the drawings, the valve assembly is the same as that shown in Figure 1 except that instead of the valve support 14 there is provided a valve member 21, which is provided with an annular feather-edge valve 21a, and the member 22 is provided with a downwardly extended externally threaded portion 22a upon which is mounted an annularly flanged nut 22b and between the member 22a and flange on the member 22b is mounted a valve seat member 23 which is adapted to be engaged by the valve 21 with the reciprocation of the plunger 12.

In the modified form of valve assembly shown in Figures 9 and 11, the structure is the same except there is provided the plunger 24 slidably keyed in the guide 13 shown best in Fig. 11 which has a conical valve portion 24a on its upper end and the portion 12a is screw-threaded into the plunger member 24 for adjustment instead of integrally connected as in Figures 8 and 10. And in place of the member 23 there is provided a flanged member 25 thus providing two spaced members 25 and 22b for engagement with the conical portion 24a of the member 24 for providing the valve seat for engagement with said conical valve portion 24a.

In the modified form of valve assembly shown in Figures 12, 13, and 14 the inlet to the meter is entirely different and omits the dust trap. This is designated 26 and is screw-threaded at 26a on its outer side for receiving the inlet conductor. In the partition 26b is screw-threaded a valve seat member 27 which is hollow for permitting the fluid to pass therethrough. It is provided with a feather-edge seat 27a which is adapted to engage the valve member 28, secured in the upper end of a plunger 29. This plunger 29 is reciprocally mounted in a guide 30 which fits into an orifice in the lower side of the chamber member 31. This chamber member 31 is provided with slots 31a for permitting the passage of fluid to the meter. The plunger connection and the regulator lever are the same as that shown in Figure 9 of the drawings except the plunger connection is slightly shorter.

It will be noted that the object of providing modified form and valve seat structure is to provide a valve assembly of efficiency for great variations of pressure dependent upon the use of the apparatus.

It is obvious that with the above described construction there is provided a combination apparatus of this class in which the fluid admitted to the meter is cleaned of dust and passes through a valve into the meter, that the fluid on entering the meter contacts with other fluid therein and forms a pressure which operates on the diaphragm which communicates directly with the interior of the meter, that any pressure exceeding a predetermined pressure in the meter will operate the diaphragm which in turn will move the lever 6 which will tend to close the inlet valve to the meter and therefore regulate the pressure, that the pressure may be adjusted for predetermined pressure by means of the adjustment of the spring 8 by means of the adjusting nut 9, but if it is desired to stop the use of the gas and meter by removing the cap 10 and turning the nut 7b down against the nut 9 as shown in Figure 4 of the drawings, the valve is locked closing the inlet to the meter, and by placing the cap 10 thereover and sealing the same the usage cannot be continued preventing any unauthorized usage as any unauthorized usage must be by breaking the seal 10b, that the regulator is in direct cooperation with the interior of the meter and that the regulator connects with the inlet valve to the meter therefore providing direct action on the intake to the meter, that the dust trap positioned in close proximity to the inlet valve to the meter and regulating valve provide means for cleansing the fluid as it enters the meter, and also that the cleaned fluid passes through the valves, that the combining of these structures does away with a large number of couplings where they are in separated relation therefore minimizes the leakage.

Though I have shown and described a particular construction, combination and arrangement of parts and portions, and certain modifications thereof, I do not wish to be limited to the particular construction, combination and arrangement, thereof, but desire to include in the scope of my invention the construction, combination and arrangement substantially as set forth in the appended claims.

Having thus described my invention, what I claim as new and desire to secure by Letters Patent is:

1. In a combination pressure regulator and meter cap, the combination with the readily removable conventional Sprague meter cap with downwardly directed inlet at one side in the cap only and an upwardly directed outlet at the opposite side in the cap only and with a flat top intermediate said inlet and outlet, of an orifice in said flat top, a diaphragm mounted over said orifice and forming the upper wall of said cap and substantially covering the space between said inlet and said outlet, a valve mounted in the inlet to said meter cap provided with a downwardly extended stem and a lever connected centrally with said diaphragm and pivotally connected intermediate its ends with the valve stem, a casing secured over the margin of said diaphragm and extending upwardly therefrom, sealed means for adjusting the tension of said diaphragm in said casing, means in connection with said diaphragm and said adjusting means for locking said diaphragm with the valve in closed position, and means in connection with said locking means for detecting any tampering with said locking means.

2. In a combination pressure regulator and meter cap, the combination with a readily removable meter cap with downwardly directed inlet at one side in the cap only and an upwardly directed outlet at the opposite side in the cap only and with a flat top intermediate said inlet and outlet, of an orifice in said flat top, a diaphragm mounted over said orifice and forming the upper wall of said cap and substantially covering the space between said inlet and said outlet, a valve mounted in the inlet to said meter cap provided with a downwardly extended stem and a lever connected centrally with said diaphragm and pivotally connected intermediate its ends with the valve stem, a casing secured over the margin of said diaphragm and extending upwardly therefrom provided with a lug on its exterior, sealed means for adjusting the tension of said diaphragm in said casing, means in connection with said diaphragm and said adjusting means for locking said diaphragm with the valve in closed position, means in connection with said locking means for detecting any tampering with said locking means, said sealed means consisting of a removable cap with an extended lug adapted to be positioned in close proximity to said lug on said casing for sealing said cap against removal.

3. In a combination pressure regulator and meter cap the combination with a readily removable meter cap with downwardly directed inlet at one side in the cap only and an upwardly directed outlet at the opposite side in the cap only and with a flat top intermediate said inlet and outlet, of an orifice in said flat top, a diaphragm mounted over said orifice and forming the upper wall of said cap and substantially covering the space between said inlet and said outlet, a valve mounted in the inlet to said meter cap provided with a downwardly extended stem and a lever connected centrally with said diaphragm and pivotally connected intermediate its ends with the valve stem, a casing secured over the margin of said diaphragm and extending upwardly therefrom, and sealed means for adjusting the tension of said diaphragm in said casing.

4. In a combination pressure regulator and meter cap, the combination with a readily removable meter cap with downwardly directed inlet at one side in the cap only and an upwardly directed outlet at the opposite side in the cap only and with a flat top intermediate said inlet and outlet, of an orifice in said flat top, a diaphragm mounted over said orifice and forming the upper wall of said cap and substantially covering the space between said inlet and said outlet, a valve mounted in the inlet to said meter cap provided with a downwardly extended stem and a lever connected centrally with said diaphragm and pivotally connected intermediate its ends with the valve stem, a casing secured over the margin of said diaphragm and extending upwardly therefrom, sealed means for adjusting the tension of said diaphragm in said casing, and means in connection with said diaphragm and said adjusting means for locking said diaphragm with the valve in closed position.

OTTO B. GOLDKAMP.